United States Patent
Moore et al.

[15] 3,689,553
[45] Sept. 5, 1972

[54] TRIFLUOROMETH ANESULFONAMIDO-SUBSTITUTED DESOXYBENZOINS

[72] Inventors: George G. I. Moore, Village of Birchwood; Joseph Kenneth Harrington, Village of Edina, both of Minn.

[73] Assignee: Minnesota Mining and Manufacturing Company, St. Paul, Minn.

[22] Filed: Jan. 4, 1971

[21] Appl. No.: 103,804

[52] U.S. Cl. ............... 260/556 F, 260/578, 424/321
[51] Int. Cl. ............................................. C07c 143/74
[58] Field of Search .................................. 260/556 F

[56] References Cited

UNITED STATES PATENTS 3,576,866    4/1971    Robertson et al. ........ 260/556

*Primary Examiner*—Henry R. Jiles
*Assistant Examiner*—G. Thomas Todd
*Attorney*—Kinney, Alexander, Sell, Steldt & Delahunt

[57] ABSTRACT

Trifluoromethanesulfonamido-substituted desoxybenzoins and pharmaceutically acceptable salts thereof. These compounds are active anti-microbial agents.

5 Claims, No Drawings

TRIFLUOROMETHANESULFONAMIDO-SUBSTITUTED DESOXYBENZOINS

This invention relates to trifluoromethanesulfonamido-substituted desoxybenzoins and pharmaceutically acceptable salts thereof. These compounds are active antimicrobial agents.

Certain substituted trifluoromethanesulfonanilides are known. Thus, such compounds wherein the anilide ring is linked to a phenyl ring through a carbonyl group are known anti-inflammatory agents (see for example British Pat. No. 1,198,301). Such compounds are highly aromatic and resonance stabilized since the two phenyl rings are linked by the pi electron-rich carbonyl group thus providing an extended conjugated system. The compounds of the present invention, on the other hand, have neither an extended conjugated system nor, in general, comparable anti-inflammatory activity. It has been found, however, that they do exhibit a high degree of anti-microbial activity.

Therefore, it is an object of the present invention to provide compounds which are anti-microbial agents.

It is a further object of the present invention to provide a method for controlling microorganisms.

It is still another object of the present invention to provide anti-microbial compositions containing one or more substituted trifluoromethanesulfonanilides as active ingredients therein.

Still other objects will be made apparent by the following specification.

DETAILED DESCRIPTION

According to the present invention there is provided a class of compounds of the formula

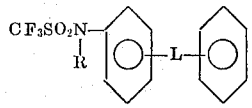

wherein R is hydrogen or a pharmaceutically acceptable cation and L is a group selected from

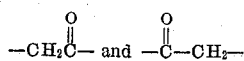

(the L moieties are represented herein so that the left hand bond thereof runs to the ring carrying the trifluoromethanesulfonamido group).

The compounds of the invention are acidic in nature when R is hydrogen. Consequently, they form salts, i.e. compounds of Formula I wherein R is a pharmaceutically acceptable cation. These are generally alkali metal (e.g. lithium, sodium and potassium), alkaline earth metal (e.g. barium, calcium and magnesium), other metal (e.g. aluminum, zinc and iron), ammonium and amine salts. Those compounds in which R is an amine cation form a preferred group. The amine salts include the salts of aliphatic (e.g. alkyl), aromatic and heterocyclic amines, as well as those having a mixture of these types of structures. The amines useful in preparing the salts of the invention can be primary, secondary or tertiary and preferably contain not more than 20 carbon atoms.

The salts of the invention can be prepared by treating the acid form (wherein R is hydrogen) with a stoichiometrically equivalent amount of an appropriate base under mild conditions. Since many of the salts are water soluble, they are often used in the form of aqueous solutions. Also, they can be used in making pharmaceutical preparations in the form of capsules for oral administration.

The compounds of Formula I wherein R is a hydrogen atom are generally produced by condensation of a trifluoromethanesulfonyl halide or anhydride with a substituted aniline according to the following scheme

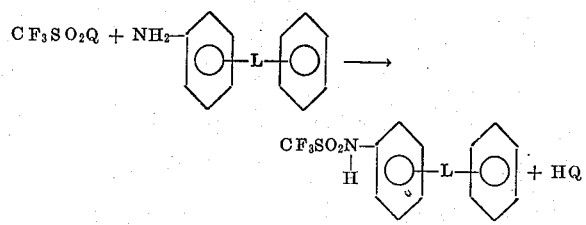

wherein Q represents a halogen atom, preferably chlorine or fluorine, or a corresponding anhydride grouping —OSO$_2$CF$_3$ and L is as previously defined. As will be seen, however, certain of the compounds can also be prepared using other methods. The intermediates used in preparing the compounds of the invention are known or can be easily prepared from known compounds by well known synthetic methods.

Approximately equivalent amounts of the reactants are brought together at temperatures most often ranging between $-15°$ and $150°$ C. If necessary or desirable the reaction can be carried out in a pressure vessel. The reaction is preferably but not necessarily carried out in the presence of an acid acceptor such as an alkaline earth or alkali metal carbonate or bicarbonate or a tertiary amine such as pyridine, triethylamine, N,N-dimethylaniline or the like. The amount of acid acceptor can be varied widely; however, a 10 mole percent excess of that amount of base sufficient to bind the liberated strong acid (HQ) is routinely employed.

The condensation is usually conducted in the presence of an appropriate inert organic solvent. Typical solvents suitable for this purpose are dichloromethane, chloroform, carbon tetrachloride, benzene, toluene, bis(2-methoxyethyl)-ether, acetonitrile, nitromethane and the like.

After reaction is complete, the product mixture is washed with aqueous hydrochloric acid, the solvent is evaporated in vacuo and the residue is dissolved in a dilute aqueous base solution which is washed with dichloromethane and treated with decolorizing charcoal. The product, in the form of a salt which is usually soluble in the basic aqueous layer is precipitated therefrom by addition of a mineral acid such as hydrochloric or sulfuric acid, and collected by filtration or extraction with dichloromethane.

The compounds of the invention wherein the connecting link is

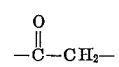

can also be prepared by oxidation of compounds having corresponding structures except that the linking group is

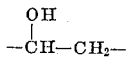

The presently preferred oxidation reagent is chromium trioxide in sulfuric acid. The intermediate compounds (wherein the linking group is

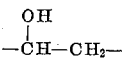

are, in turn, prepared by condensation of formyl-trifluoromethanesulfonanilides with Grignard reagents, for example benzyl magnesium chloride, in a suitable solvent such as tetrahydrofuran. The formyl-trifluoromethanesulfonanilides are prepared from known compounds by sulfonylating the corresponding dialkoxymethylanilines (with a compound of the type $CF_3SO_2Q$, wherein Q is as previously defined) and stirring the product with aqueous acid (HCl) to form the desired product in situ.

The salts of the invention are readily prepared by adding the stoichiometric amount of the selected base in inert solvent solution (aqueous or nonaqueous) to the acidic compound. The resulting solution is treated to remove the solvent, e.g. by evaporation under reduced pressure, to obtain the salt, usually as a dry powder. Appropriate bases for use in preparing the metal salts include metal oxides, carbonates, hydroxides, bicarbonates and alkoxides. The organic amine salts and the ammonium salts can be prepared by reacting the acid form with the appropriate organic base or ammonium hydroxide. Some salts are also prepared by cation exchange reactions (by reacting a salt of the invention with an organic or inorganic salt in a cation exchange reaction).

As noted previously the compounds of the invention are as a class anti-microbial agents, although some are more active than others. The anti-microbial activity can be conveniently demonstrated using a variation of the original agar-plate diffusion method of Vincent and Vincent. The culture media employed are designed to meet the minimum essential requirements for the growth of the various test organisms. They are based on the synthetic glucose-salts medium of Davis and Mingioli (DG-agar). The table below gives the media used for each of the test organisms:

| Organism | Medium |
| --- | --- |
| 1. Staphylococcus aureus | DGY |
| 2. Bacillus subtilus | DGA |
| 3. Pseudomonas aeruginosa | DG |
| 4. Escherichia coli | DG |
| 5. Streptococcus sp.* | * |
| 6. Aspergillus niger | DG |
| 7. Candida albicans | DGY |

*Strains isolated from dental caries in rats or hamsters at the National Institute of Dental Health and grown in PFY or APT agar.

The agar media are melted in a steam bath, supplements, if any, are added, and the media are cooled to 42° C. in a water bath. Then from $10^4$ to $10^5$ cells or spores of the test organism are added per 10 ml. of agar, and the media are dispensed, at 10 ml. per dish, into 9 cm. circular plastic petri dishes.

The tests are carried out quantitatively by placing 4 $\mu$l. aliquots of 1 percent, 0.1 percent and 0.01 percent solution of the test chemicals on 6.5 mm. paper discs to give 40, 4.0 and 0.4 $\mu$g. per disc, respectively.

For the first part of the tests, in serum-free media, the same culture media are used as described above. For the second part of the tests, all test organisms except number 5, are grown in PGY agar supplemented with 10 percent horse serum. Organism number 5 is grown in APT agar supplemented with 10 percent horse serum in a desiccator in 10 percent $CO_2$ in air. The others (1,2,3,4, 6 and 7) are grown in air. Plates are incubated at 30° C. for 24 hours (for bacteria and C. albicans) and 48 hours for A. Niger. The diameters of the zones of inhibition are measured, and log m is plotted against $X^2$, where m is the weight of test compound on the disc in $\mu$g. and X is the diameter of the zone of inhibition in mm.

The culture media used in the foregoing tests are as follows:

| DG: | | PGY: | |
| --- | --- | --- | --- |
| $K_2HPO_4$ | 7.0 g. | NaCl | 16.0 g. |
| $NaH_2PO_4 \cdot H_2O$ | 2.3 g. | KCl | 0.80 g. |
| $MgSO_4 \cdot 7H_2O$ | 0.1 g. | $MgSO_4 \cdot 7H_2O$ | 0.308 g. |
| $(NH_4)_2SO_4$ | 1.0 g. | $CaCl_2 \cdot 2H_2O$ | 0.032 g. |
| $CaCl_2 \cdot 2H_2O$ | 0.04 g. | $Na_2HPO_4 \cdot 7H_2O$ | 0.58 g. |
| $FeSO_4 \cdot 7H_2O$ | 0.01 g. | $KH_2PO_4$ | 0.30 g. |
| Dextrose | 2.0 g. | Phenol Red | 0.0024 g. |
| Ionagar | 8.5 g. | Yeast Extract | 2.0 g. |
| | | $Na_2HPO_4$ | 0.307 g. |
| Dist. Water | 1 liter | Glucose | 4.0 g. |
| DGY: | | | |
| DG supplemented with 1 g./l. of yeast extract | | Ionagar | 8.50 g. |
| | | Dist. Water | 1 liter |
| DGA: | | APT: | |
| DG supplemented with 600 mg./l. glutamic acid 200 mg./l. cystine 800 mg./l. asparagine | | Trypticase | 8.5 g. |
| | | Yeast Extract | 7.5 g. |
| | | Sodium Chloride | 5.0 g. |
| | | Potassium Phosphate | 5.0 g. |
| 20 mg./l. EDTA disodium | | Sodium Citrate | 5.0 g. |
| | | Dextrose | 10.0 g. |
| | | Polysorbate 80 | 0.2 g. |
| | | Magnesium Sulfate | 0.8 g. |
| | | Manganous Chloride | 0.14 g. |
| | | Ferrous Sulfate | 0.04 g. |
| | | Sodium Carbonate | 1.25 g. |
| | | Agar | 13.5 g. |

Leading references to the method used are: Vincent, J. G., and Vincent, Helen W., Proc. Soc. Exptl. Biol. Med. 55:162–164, 1944, and Davis, B.D., and Mingioli, E.S., Jour. Bact. 66:129–136, 1953. The anti-microbial agents of the invention are useful in various disinfecting and sterilizing applications such as in disinfecting and sterilizing medical and dental equipment as active components of disinfecting solutions.

The following examples are given for the purpose of further illustrating the procedures used in the present invention, but are not intended, in any way, to be limiting on the scope thereof. Thus, while the majority of the examples relate to compounds in the acid form (that is having a hydrogen atom bonded to the sulfonamido nitrogen) it is understood that the salts are likewise contemplated. The salts, which have a cation bonded to the sulfonamido nitrogen, generally have the utility areas of the corresponding acid form compounds. All melting points are uncorrected and are given in degrees Centigrade.

EXAMPLE 1

A slurry of aluminum chloride (73.2 g., 0.55 mole) in dry benzene (700 ml.) is treated at 55°-60° C. with 3-nitrophenylacetyl chloride over 1.5 hours. The resulting black mixture is heated two additional hours, then poured into an ice-hydrochloric acid mixture. The aqueous layer is separated and extracted with dichloromethane, then these extracts are combined with the benzene layer and the organic solution is dried over magnesium sulfate. The extracts are concentrated in vacuo to give a black tar which is dissolved in hot ethanol, the solution is treated with decolorizing charcoal, filtered, then cooled to yield 3-nitrodesoxybenzoin, a yellow solid, m.p. 80–81 after one recrystallization.

3-Nitrodesoxybenzoin (22.3 g., 0.092 mole) is mixed with 40 mesh iron filings (25.8 g., 0.461 mole), water (40 ml.) and acetic acid (185 ml.) and the mixture is heated at 100° C. for 2 hours. The solution is cooled, poured into excess water, filtered and extracted with dichloromethane. The extracts are washed twice with 5 percent sodium bicarbonate, once with water, dried over magnesium sulfate and concentrated in vacuo to a semi-solid. Chromatographic purification on alumina given tan 3-aminodesoxybenzoin, m.p. 81°–89° C.

3-Aminodesoxybenzoin (10.8 g., 0.051 mole) is dissolved in dichloromethane and triethylamine (5.2 g., 0.052 mole) and the chilled (0° to 5° C.) solution is treated with trifluoromethanesulfonic anhydride (14.5 g., 0.051 mole). The reaction mixture is washed with 5 percent hydrochloric acid and concentrated by evaporation in vacuo. The residue is dissolved in 5 percent sodium hydroxide solution, filtered through decolorizing charcoal and acidified with concentrated hydrochloric acid to give a solid. The mixture is extracted with dichloromethane, dried over magnesium sulfate and recrystallized twice from benzene to provide white needles of 3-trifluoromethanesulfonamidodesoxybenzoin, m.p. 136°–137.5° C.

| Analysis | %C | %H | %N |
|---|---|---|---|
| Calculated for $C_{15}H_{12}F_3NO_3S$: | 52.5 | 3.5 | 4.1 |
| Found: | 52.9 | 3.6 | 4.1 |

EXAMPLE 2

3-Formyltrifluoromethanesulfonanilide (68.7 g., 0.27 mole) is converted to its sodium salt by stirring with 270 ml. of 1 N sodium hydroxide solution, then evaporating in vacuo to a tan powder, m.p. 226°–227° C. (dec.)

A solution of benzylmagnesium chloride in tetrahydrofuran is prepared from magnesium (3.64 g., 0.15 mole) and benzyl chloride (19.0 g., 0.15 mole). To this is added sodium 3-formyltrifluoromethanesulfonanilide (13.1 g., 0.05 mole) in tetrahydrofuran (50 ml.). The solution is distilled, removing the tetrahydrofuran. Benzene is added and the solution is cooled and washed with dilute sulfuric acid and the washings are then extracted with dichloromethane. The benzene and dichloromethane fractions are combined, then evaporated in vacuo. The residue is dissolved in dilute sodium hydroxide solution and this solution is extracted with dichloromethane, then acidified with concentrated hydrochloric acid, giving 3-(2'-phenyl-1'-hydroxyethyl)trifluoromethanesulfonanilide. Repeated recrystallization from benzene and treatment with decolorizing charcoal gives white crystals, m.p. 101.5°–103.5° C.

| Analysis | %C | %H | %N |
|---|---|---|---|
| Calculated for $C_{15}H_{14}F_3NO_3S$: | 52.2 | 4.1 | 4.1 |
| Found: | 51.9 | 4.3 | 4.0 |

A solution of chromium trioxide (2.9 g., 0.029 mole) in water (4 ml.) is treated with concentrated sulfuric acid (4.46 g., 0.046 mole) and then sufficient water to dissolve the precipitated salts is added. This solution is added slowly to a cooled solution of 3-(2'-phenyl-1'-hydroxyethyl)trifluoromethanesulfonanilide (12.3 g., 0.036 mole) in acetone (50 ml.). Stirring is continued for a short while, then isopropanol is added and the organic solvents are removed in vacuo. The remaining aqueous layer is treated with excess dilute sodium hydroxide, then the basic solution is filtered through decolorizing charcoal and the filtrate is acidified with concentrated hydrochloric acid to give an orange oil. The oil is extracted into dichloromethane and dried over magnesium sulfate, then recovered by evaporation in vacuo. Chromatography on alumina, eluting with benzene and dichloromethane, gives a solid. When recrystallized from a toluene-cyclohexane mixture the product is a white solid, 3'-trifluoromethanesulfonamidodesoxybenzoin, m.p. 128.5°–130° C.

| Analysis | %C | %H | %N |
|---|---|---|---|
| Calculated for $C_{15}H_{12}F_3NO_3S$: | 52.5 | 3.5 | 4.1 |
| Found: | 52.9 | 3.7 | 4.1 |

WHAT IS CLAIMED IS:
1. A compound of the formula

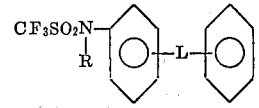

wherein R is hydrogen or a pharmaceutically acceptable cation and L is selected from

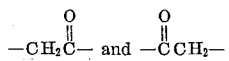

2. A compound according to claim 1 wherein L is

3. A compound according to claim 1 wherein L is

4. 3-Trifluoromethanesulfonamidodesoxybenzoin according to claim 2.

5. 3'-Trifluoromethanesulfonamidodesoxybenzoin according to claim 3.

* * * * *

UNITED STATES PATENT OFFICE
CERTIFICATE OF CORRECTION

Patent No. 3,689,553          Dated September 5, 1972

Inventor(s) George G.I. Moore and Joseph Kenneth Harrington

It is certified that error appears in the above-identified patent and that said Letters Patent are hereby corrected as shown below:

In the heading under [73] "Minnesota Mining and Manufacturing Company, St. Paul, Minn." should be --Riker Laboratories, Inc., Northridge, California--

Column 3, line 10, --)-- should be inserted after the formula

Signed and sealed this 8th day of May 1973.

(SEAL)
Attest:

EDWARD M. FLETCHER, JR.
Attesting Officer

ROBERT GOTTSCHALK
Commission of Patents